(12) United States Patent
Weaver et al.

(10) Patent No.: US 10,191,137 B2
(45) Date of Patent: Jan. 29, 2019

(54) SYSTEMS AND METHODS FOR BEACON DEVICE FLEET MANAGEMENT

(71) Applicant: Google LLC, Mountain View, CA (US)

(72) Inventors: Mark William Weaver, Bellevue, WA (US); Peter Sasaki, London (GB); Jonathan Robert Morace, London (GB); Salvatore Scellato, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/838,545

(22) Filed: Dec. 12, 2017

(65) Prior Publication Data

US 2018/0113188 A1 Apr. 26, 2018

Related U.S. Application Data

(63) Continuation of application No. 14/922,713, filed on Oct. 26, 2015, now Pat. No. 9,864,041.
(Continued)

(51) Int. Cl.
*H04W 84/12* (2009.01)
*G01S 5/02* (2010.01)
(Continued)

(52) U.S. Cl.
CPC ............ *G01S 5/0236* (2013.01); *H04W 4/02* (2013.01); *H04W 4/80* (2018.02); *H04W 40/244* (2013.01); *H04W 64/003* (2013.01); *G01S 1/68* (2013.01); *G01S 5/0242* (2013.01); *G01S 5/14* (2013.01); *H04W 4/025* (2013.01)

(58) Field of Classification Search
CPC ....... H04W 4/02; H04W 24/04; H04W 4/021; H04W 4/90; H04W 64/00; H04W 48/04; H04W 84/12; H04W 88/02; H04W 8/005; H04W 8/22; H04W 24/02; H04W 48/10;
(Continued)

(56) References Cited

U.S. PATENT DOCUMENTS

| 7,414,988 B2 | 8/2008 | Jones et al. |
| 7,433,694 B2 | 10/2008 | Morgan et al. |

(Continued)

OTHER PUBLICATIONS

ESTBeaconManager Class Reference, http://estimote.github.io/iOS-SDK/Classes/ESTBeaconManager.html#//api/name/startMonitoringForRegion, retrieved on Jul. 9, 2015, 11 pages.
(Continued)

*Primary Examiner* — Quan M Hua
(74) *Attorney, Agent, or Firm* — Dority & Manning, PA

(57) ABSTRACT

Systems and methods for beacon device fleet management are provided. One example system includes a plurality of beacon devices, a plurality of mobile computing devices, a fleet management system, and a fleet owner computing devices. One example method includes receiving, by the fleet management system, a device status request from the fleet owner computing device. The fleet management system determines one or more operational statuses of beacon devices owned by the fleet owner and transmits data indicative of the one or more operational statuses to the fleet owner computing device. The operational statuses can include a current detection status (e.g., online or offline), a location status, a power source status, and/or other operational parameters.

20 Claims, 10 Drawing Sheets

Related U.S. Application Data

(60) Provisional application No. 62/192,467, filed on Jul. 14, 2015.

(51) Int. Cl.
*H04W 4/02* (2018.01)
*H04W 64/00* (2009.01)
*H04W 40/24* (2009.01)
*H04W 4/80* (2018.01)
*G01S 5/14* (2006.01)
*G01S 1/68* (2006.01)

(58) Field of Classification Search
CPC .... H04W 88/08; H04W 92/12; H04L 65/403; H04L 67/16
See application file for complete search history.

(56) References Cited

U.S. PATENT DOCUMENTS

| | | | |
|---|---|---|---|
| 8,031,657 B2 | 10/2011 | Jones et al. | |
| 8,542,637 B2 | 9/2013 | Bandhakavi et al. | |
| 8,577,389 B2 | 11/2013 | Lin et al. | |
| 8,618,928 B2 | 12/2013 | Weed et al. | |
| 9,119,169 B2 | 8/2015 | Luo et al. | |
| 2010/0286997 A1 | 11/2010 | Srinivasan | |
| 2011/0119222 A1 | 5/2011 | Rosinski | |
| 2012/0184292 A1 | 7/2012 | Lin et al. | |
| 2012/0185458 A1 | 7/2012 | Liu et al. | |
| 2012/0243433 A1* | 9/2012 | Kneckt | H04W 56/002 370/252 |
| 2012/0246299 A1* | 9/2012 | Carls | H04L 41/5067 709/224 |
| 2012/0286997 A1 | 11/2012 | Lin et al. | |
| 2014/0073345 A1 | 3/2014 | Chintalapudi et al. | |
| 2015/0120083 A1 | 4/2015 | Gurovich et al. | |
| 2016/0050564 A1 | 2/2016 | Niewczas et al. | |
| 2016/0212579 A1 | 7/2016 | Duan et al. | |

OTHER PUBLICATIONS

ESTBeaconManagerDelegate Protocol Reference, http://estimote.github.io/iOS-SDK/Protocols/ESTBeaconManagerDelegate.html#//api/name/beaconManager.didEnterRegion, retrieved on Jul. 9, 2015, 7 pages.

Estimote-Cloud, https://cloud.estimote.com/docs/, retrieved on Jul. 9, 2015, 11 pages.

Estimote Developer Docs, http://developer.estimote.com/cloud/oauth/, retrieved on Jul. 9, 2015, 5 pages.

Gimbal Proximity Overview, https://gimbal.com/doc/proximity_overview.html, retrieved on Jul. 9, 2015, 23 pages.

Krawiec, "Reality Matters: The Estimote Team Blog", Apr. 23, 2015, blog.estimote.com, retrieved on Jul. 9, 2015, 8 pages.

Krawiec, "Is There a RESTful API for Estimote Cloud?", May 13, 2015, https://community.estimote.com/hc/en-us/articles/20433183-Is-there-a-RESTful-API-for-Estimote-Cloud-, retrieved on Jul. 9, 2015, 2 pages.

Puchta, "What is Estimote Cloud?", Jul. 7, 2015, https://community.estimote.com/hc/en-us/articles/203854516-What-is-Estimote-Cloud-, retrieved on Jul. 9, 2015, 4 pages.

Socha, "Does Estimote Offer Analytics for Beacons?", Jun. 22, 2015, https://community.estimote.com/hc/en-us/articles/204231993-Does-Estimote-offer-Analytics-for-beacons-, retrieved on Jul. 9, 2015, 7 pages.

* cited by examiner

SYSTEMS AND METHODS FOR BEACON DEVICE FLEET MANAGEMENT

PRIORITY CLAIM

The present application is a continuation of U.S. application Ser. No. 14/922,713 having a filing date of Oct. 26, 2015, which is based on and claims priority to U.S. Provisional Application 62/192,467 having a filing date of Jul. 14, 2015. Applicant claims priority to and benefit of all such applications and incorporate all such applications herein by reference.

FIELD

The present disclosure relates generally to beacon device fleet management and, more particularly, to systems and methods to enable beacon device fleet owners to ascertain various operational statuses of their beacon devices, including current detection status (e.g., online or offline), current location, remaining battery lifespan, and/or other operational parameters.

BACKGROUND

In recent years, location based functionality associated with mobile computing devices has become increasingly popular. Location based functionality can allow a mobile computing device, such as a smartphone, tablet computing device, wearable computing device, etc. to receive information and to perform actions associated with the information. Such location based functionality can be implemented, for instance, through the use of beacon devices.

Beacon devices are a quickly advancing technology that can be used, for instance, in determining proximity, determining location, and/or providing access to certain location-specific information. A beacon device is typically a small, low cost, self-contained device that can periodically provide information. For example, a beacon device can periodically broadcast its identity and/or other data using a short range wireless communication technology such as, for example, Bluetooth low energy (BLE).

A mobile computing device can receive or otherwise observe the broadcasted information and leverage knowledge of the identity of the beacon device and proximity to the beacon device for various purposes, including determining location, communication, asset tracking, retail identification, safety, etc. Thus, beacon devices are becoming a popular option to increase user engagement with content or information provided by the beacon device owner.

However, if a particular beacon devices owner deploys hundreds or even thousands of beacon devices, the beacon device owner will need some way to manage the fleet of beacon devices. One drawback to the disconnected and self-powered nature of beacon devices is the lack of a significant number of easily obtainable signals which indicate whether if a beacon is still healthy (e.g., powered and operating properly).

As such, many different problems are posed to beacon device owners. For example, it may be difficult to consistently assess whether the beacon device is still located at its intended or expected location, if the beacon devices' batteries are still operative, if the beacon devices have been damaged at all, etc. Additionally, beacon owners will want to understand the lifespan of beacon devices and the coverage of their deployment.

In short, managing a large fleet of beacon devices is a challenging problem in need of an effective solution.

SUMMARY

Aspects and advantages of the present disclosure will be set forth in part in the following description, or may be obvious from the description, or may be learned through practice of embodiments of the present disclosure.

One example aspect of the present disclosure is directed to a computer-implemented method to enable beacon device fleet management. The method includes receiving, by a fleet management system, a plurality of observation reports respectively from a plurality of mobile computing devices. Each observation report identifies at least one of a plurality of beacon devices observed by a reporting mobile computing device and describes a location of the reporting mobile computing device when the reporting mobile computing device observed the identified at least one beacon device. The method includes receiving, by the fleet management system from a fleet owner computing device, a device status request that requests an operational status of at least a first beacon device of the plurality of beacon devices. The method includes analyzing, by the fleet management system, at least a portion of the plurality of observation reports that are associated with the first beacon device to determine a detection interval for the first beacon device. The detection interval is an amount of time that is based at least in part on a historical observation frequency at which the first beacon device has been observed by mobile computing devices. The method includes determining, by the fleet management system, whether a difference between a current time and a timestamp of a most recent observation report of the plurality of observation reports that are associated with the first beacon device is less than the detection interval of the first beacon device. When the difference between the current time and the timestamp of the most recent observation report is greater than the detection interval, the method includes transmitting, by the fleet management system to the fleet owner computing device, data that indicates that the first beacon device is not currently detected. When the difference between the current time and the timestamp of the most recent observation report is less than the detection interval, the method includes transmitting, by the fleet management system to the fleet owner computing device, data that indicates that the first beacon device is currently detected.

Another example aspect of the present disclosure is directed to a computer-implemented method to determine beacon device location statuses. The method includes receiving, by a fleet management system, a plurality of observation reports respectively from a plurality of mobile computing devices. Each observation report identifies at least one of a plurality of beacon devices observed by a reporting mobile computing device and describes a location of the reporting mobile computing device when the reporting mobile computing device observed the identified at least one beacon device. The method includes obtaining, by the fleet management system, at least a portion of the plurality of observation reports that are associated with a first beacon device. The method includes clustering, by the fleet management system, the obtained observation reports based on location to generate one or more clusters. Each cluster includes a subset of the obtained observation reports. The method includes identifying, by the fleet management system, the cluster with the most recent timestamps. The method includes determining, by the fleet management system, a weighting factor for each of the observation reports included in the cluster with the most recent timestamp. The method includes determining, by the fleet management system, a representative location of the cluster with the most recent timestamp, the representative location based at least in part on the weighting factor for each observation report. The method includes comparing, by the fleet management system, the representative location of the cluster with the most recent timestamps with an expected location of the first beacon device. When the representative location of the cluster with the most recent timestamps matches the expected location of the first beacon device, the method includes storing, by the fleet management system, data that indicates that the first beacon device is located at its expected location. When the representative location of the cluster with the most recent timestamps does not match the expected location of the first beacon device, the method includes storing, by the fleet management system, data that indicates that the first beacon device is not located at its expected location.

Another example aspect of the present disclosure is directed to a computer-implemented method to enable beacon device fleet management. The method includes receiving, by a fleet management system, a plurality of observation reports respectively from a plurality of mobile computing devices. Each observation report identifies at least one of a plurality of beacon devices observed by a reporting mobile computing device and describes a location of the reporting mobile computing device when the reporting mobile computing device observed the identified at least one beacon device. One or more of the plurality of observation reports identify a plurality of simultaneously observed beacon devices. The plurality of simultaneously observed beacon devices include at least a first beacon device and a second beacon device. The method includes receiving, by the fleet management system from a fleet owner computing device, a device status request that requests an operational status of at least the first beacon device of the plurality of beacon devices. The method includes determining, by the fleet management system, a current location of the first beacon device based at least in part on the respective locations indicated by the one or more of the plurality of observation reports and based at least in part on respective current locations of the plurality of simultaneously observed beacon devices. The method includes determining, by the fleet management system, a location status of the first beacon device based at least in part on the current location of the first beacon device. The method includes transmitting, by the fleet management system, data that describes the determined location status of the first beacon device to the fleet owner computing device.

Another example aspect of the present disclosure is directed to a computer-implemented method to assess beacon device battery life. The method includes determining, by the fleet management system, a current expended operational lifespan of a first battery of a first beacon device. The method includes fitting, by the fleet management system, a curve that approximates a third order polynomial to battery life data points collected for at least one of the first beacon device and a plurality of other beacon devices which share one or more energy consumption characteristics with the first beacon device. The method includes determining, by the fleet management system, a total expected lifespan for the first battery of the first beacon device based at least in part on the fitted curve that approximates the third order polynomial. The method includes determining, by the fleet management system, an expected remaining lifespan for the first battery of the first beacon device based at least in part on the current expended operational lifespan and the total expected lifespan.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Overview

Figure 1:
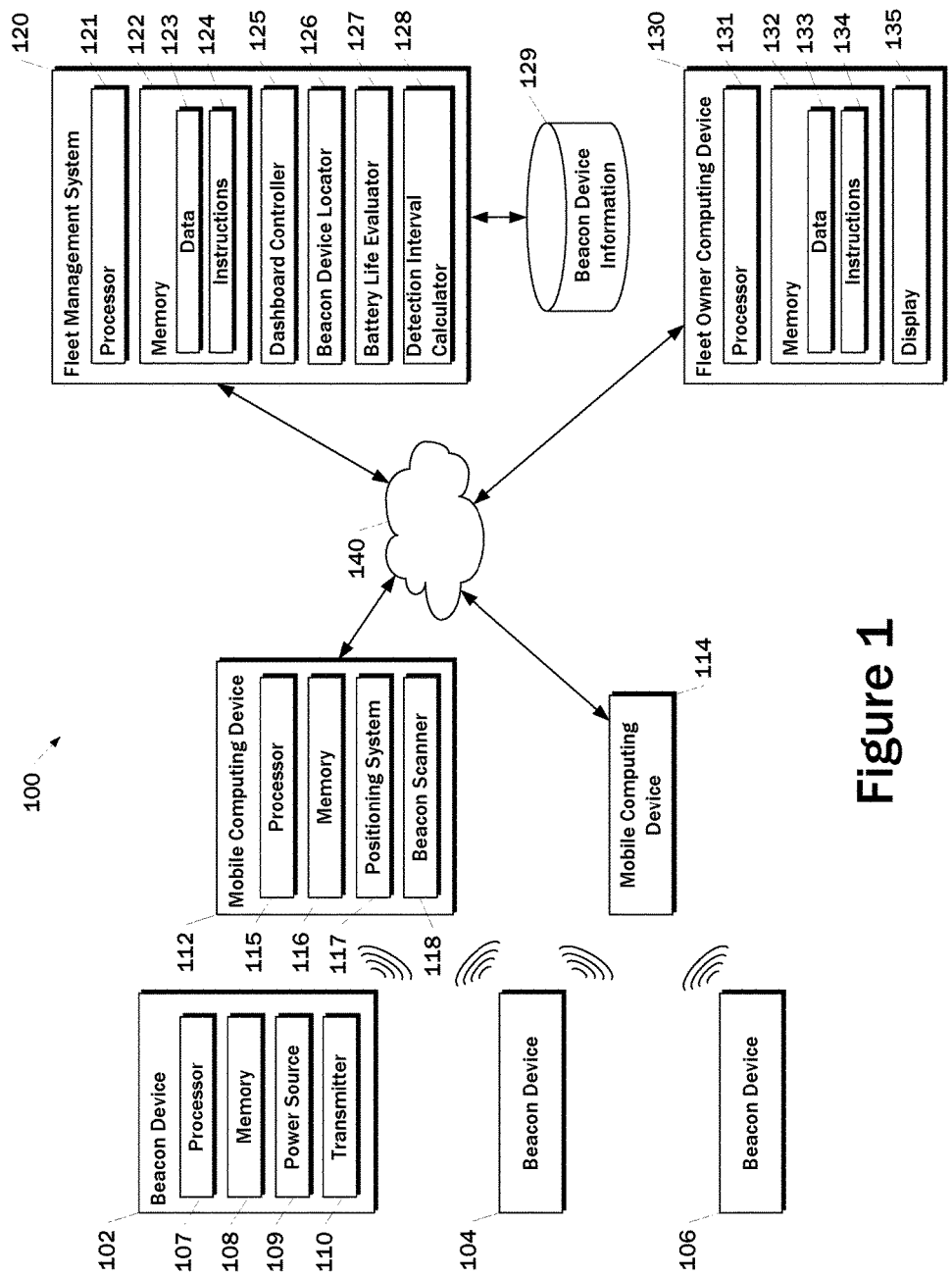
FIG. 1 depicts an example system for beacon device fleet management according to an example embodiment of the present disclosure.

Generally, the present disclosure is directed to systems and methods for beacon device fleet management. As one example, a fleet management system periodically receives observation reports from various mobile computing devices. The observation reports indicate a location at which a particular mobile computing device observed (e.g., received a broadcast from) a particular beacon device. The fleet management system can use the locations and other data included in the observation reports to determine the current operational statuses of each of the beacon devices. An owner of a fleet of beacon devices can use a fleet owner computing device to interact with the fleet management system and receive information regarding her fleet of beacon devices. For example, the fleet owner computing device can retrieve the real-time operational statuses of the fleet of beacon devices from the fleet management system using an application programming interface (API). The current operational statuses can include a detection status (e.g., broadcasting or not-broadcasting), current location, remaining battery lifespan, and/or other operational parameters. The operational statuses or other analytics can be presented to the fleet owner on a dashboard user interface.

The present disclosure leverages the ubiquity of mobile computing devices (e.g., smartphones) to capture a significant number of observation reports for various fleets of beacon devices. The fleets of beacon devices may have different fleet owners of different sizes (e.g., individual versus large corporation). The fleet management system acts as a central repository of beacon device status data and can provide various analytics about beacon device health and usage.

Thus, the present disclosure eliminates the previous requirement for a fleet owner to have either the sizeable resources necessary to manually check a fleet of beacon devices or widespread deployment of a fleet owner-specific application on mobile devices to collect beacon device information. Further, the systems and methods of the present disclosure enable a fleet owner that does not have significant technical experience (e.g., a museum using beacon devices to provide information about exhibits) to receive and understand meaningful analytics regarding their fleet of beacon devices.

According to one example aspect of the present disclosure, the fleet management system can determine a detection status for each of the plurality of beacon devices. The detection status can indicate whether the beacon device has recently been detected by any mobile computing devices and, therefore, provides an indication of whether the beacon device is actively broadcasting or not actively broadcasting.

In some implementations, the fleet management system determines a detection status for a particular beacon device based on a dynamically determined detection interval for such beacon device. The dynamically determined detection interval is an amount of time that can be based at least in part on a historical observation frequency at which the particular beacon device has been observed by mobile computing devices in the past. For example, if the particular beacon device has been relatively frequently observed in the past, then a shorter detection interval can be dynamically determined for the beacon device. Likewise, if the particular beacon device has been relatively infrequently observed in the past, then a longer detection interval can be determined for the beacon device. In some implementations, the fleet management system determines the detection interval based only on some time window or number of recently received observation reports.

As one example, if a difference between a current time and a timestamp of a most recent observation report for a particular beacon device is less than the detection interval, then the detection status of the particular beacon device can be set to currently detected. However, if the difference between the current time and the timestamp of the most recent observation report for the particular beacon device is greater than the detection interval, then the detection status of the particular beacon device can be set to not currently detected.

The beacon device owner can retrieve or otherwise request and receive the detection status from the fleet management system. As another example, the fleet management system can continuously and/or periodically determine the detection status of each beacon device. When the detection status of a particular beacon device changes from currently detected to not currently detected, the fleet management system can send an alert (e.g., message) to the beacon device owner that indicates that the particular beacon device may be dead, missing, broken, damaged, and/or otherwise not currently broadcasting or otherwise properly operating.

According to another example aspect of the present disclosure, the fleet management system can determine a location status for each of the plurality of beacon devices. The location status can indicate a current location for a particular beacon device and/or can simply indicate whether or not the beacon device is currently located at its expected location (e.g., the location at which it was placed and intended to remain by the beacon device owner). As another example, the location status for each beacon device can indicate whether the beacon device is a stationary device or a non-stationary device.

In some implementations of the present disclosure, the fleet management system can use one or more clustering techniques to determine a current location for each of the beacon devices. Example clustering techniques include the OPTICS algorithm ("ordering points to identify the clustering structure"), k-means clustering, or other techniques. In other implementations, instead of performing clustering, respective probabilities for a plurality of candidate locations can be built using Bayesian inference.

As one example, the fleet management system can obtain for analysis at least a portion of the plurality of observation reports that are associated with a particular beacon device. For example, a number or a time window of the most recent observation reports can be obtained from a beacon device information database which stores the received observation reports. The fleet management system can cluster the obtained observation reports based on location and/or timestamp to generate one or more clusters. Each cluster contains a subset of the obtained observation reports.

In some implementations, if any of the clusters have a geographic radius that is greater than a threshold radius, then the number or time window of the obtained observation reports and/or the parameters of the clustering technique can be revised and the clustering technique can be performed again.

Once suitable clusters of observation report locations have been generated, the cluster with the most recent timestamps can be identified. Generally, the center or average of the cluster with the most recent timestamps can be determined to be the current location of the particular beacon device.

In some implementations, if the timestamps of the generated clusters are determined to be substantially overlapping, then the fleet management system can mark the particular beacon device as a non-stationary device that is not usable as a source of location information. As another example, if the observation reports are so geographically diverse that they cannot be suitably clustered, then the fleet management system can mark the beacon device as a non-stationary device.

In some implementations, a weighting factor can be determined for each of the observation reports included in the selected cluster. The weighting factors can be used to determine a representative location of the cluster. For example, the representative location of the cluster can be a weighted centroid determined based on the weighting factors.

The weighting factors for each observation report can be determined based on various data which indicates or otherwise impacts a confidence that the corresponding observation report provides true or otherwise meaningful data regarding the location of the particular beacon device.

As one example, the weighting factors can be determined based on an accuracy radius provided by mobile computing devices within or along with the each observation report. For example, the mobile computing device or the fleet management system can determine the accuracy radius for the location in a particular observation report based on data used by the mobile computing devices to determine its location. For example, various means of determining location (e.g., GPS versus cell triangulation) can result in the correspondingly determined locations receiving different accuracy radiuses. Generally, a larger accuracy radius indicates that the corresponding location provided by the observation report is less accurate and, therefore, the observation report can be assigned a relatively smaller weighting factor so as to have a relatively smaller impact on the location of the representative location of the cluster. Likewise, an observation report with a relatively smaller accuracy radius can receive a relatively larger weighting factor.

As another example, the weighting factors can be based on a plurality of reliability factors respectively associated with the plurality of mobile computing devices. Thus, the weighting factor assigned to a particular observation report can be dependent upon the reliability factor associated with the particular mobile computing device or user of such mobile computing device from which such particular observation report was received. For example, the reliability factor associated with a particular mobile computing device can be indicative of a historical reliability of observation reports provided by such mobile computing device.

The fleet management system can determine a representative location for the cluster with the most recent timestamps. The representative location can be set as the current location of the beacon device. In some implementations, the current location of the beacon device can be compared to an expected location of the beacon device to determine the location status of beacon device. The expected location for a particular beacon device can be the intended and/or original location of the beacon device when installed or otherwise deployed by the beacon device owner and can be provided to the fleet management system upon initial set up.

As one example, if the current location matches the expected location, the beacon device can be marked as not moved or otherwise present at its expected location. However, if the current location does not match the expected location the beacon device can be marked as moved or otherwise not present at its expected location. If the location status for a particular beacon device changes from not moved to moved, the fleet management system can send an alert or message to the beacon device owner to inform the beacon device owner that the beacon device has been moved. As another example, the beacon device owner can retrieve or otherwise request and receive the location status of the beacon device from the fleet management system (e.g., through the use of an API).

According to another aspect of the present disclosure, certain observation reports may identify a plurality of simultaneously observed beacon devices. The systems and methods of the present disclosure can leverage the knowledge that multiple beacon devices have been simultaneously observed by a mobile computing device at a single location to refine or otherwise determine the current location for such simultaneously observed beacon devices.

As one example, the fleet management system can generate one or more simulated observation reports based at least in part on the one or more observation reports that identify the plurality of simultaneously observed beacon devices. Each of the one or more simulated observation reports can describe an additional observation location determined based at least in part on the respective current locations of the plurality of simultaneously observed beacon devices. For example, the additional observation locations can be the current location(s) of the simultaneously observed beacon devices or can be some weighted average of the location indicated by the observation report and the current location(s) of the simultaneously observed beacon devices.

To provide an example, a first authentic observation report may indicate that a mobile computing device simultaneously observed beacon devices A, B, and C while the mobile computing device was located at location X. To assist in determining the current location of beacon device A, the first authentic observation report of location X can be stored for beacon device A. In addition, a first simulated observation report can be stored for beacon device A, where the location indicated by the first simulated observation report is some weighted average of location X, the current location B of beacon device B, and the current location C of beacon device C. As another example, two simulated observation reports can be generated that respectively indicate the weighted average of location X and location B and the weighted average of location X and location C.

The simulated observation reports can be stored and associated with the beacon device A. All observation reports associated with the beacon device A (e.g., both authentic observation reports and simulated observation reports) can be used to determine the current location of beacon device A. For example, the clustering techniques described above can be applied to all observation reports.

As yet another example, instead of generating additional simulated observation reports, the fleet management system can modify the respective locations described by the observation reports that identify simultaneously observed beacon devices. Thus, to continue the example provided above, instead of generating one or more simulated observation reports, the fleet management system can modify the location indicated by the first authentic observation report (e.g., location X) to some weighted average of location X, location B, and location C. Thus, the present disclosure contemplates various techniques which leverage observation reports that identify simultaneously observed beacon devices to determine or refine the location of the observed beacon devices.

According to another aspect of the present disclosure, the fleet management system can determine a power source status for each of the beacon devices. The power source status can indicate a state of charge (e.g., 68%) of a power source (e.g., battery) of the beacon device or can indicate an expected remaining lifespan (e.g., 10 days remaining; 27,000 broadcast frames remaining; etc.) of the power source.

As one example, if a sufficient number of data points exist, the fleet management system can determine the expected remaining lifespan of a battery of a particular beacon device by fitting a curve that approximates a third order polynomial to state of charge or voltage data collected for the particular beacon device.

As another example, the expected remaining lifespan of a particular battery of a particular beacon device can be determined by analyzing data points collected for other beacon devices that share energy consumption characteristics with the particular beacon device. For example, a curve that approximates the third order polynomial can be fitted to battery life data points collected for a plurality of other beacon devices that have the same battery type, transmission power, and transmission rate as the particular beacon device. The total expected lifespan for the particular battery can be determined based on the fitted curve. The expected remaining lifespan can be found by comparing the currently expended lifespan of the particular battery to the total expected lifespan.

In some implementations of the present disclosure, the above described curve fitting techniques are performed in real-time based on battery life data points provided from recent observation reports for beacon devices which share energy consumption characteristics.

In other implementations of the present disclosure, the curves are pre-fitted to sets of battery life data points previously collected for beacon devices which share energy consumption characteristics. The total expected lifespans indicated by the curves are stored to a lookup table. The fleet management system then uses one or more energy consumption characteristics of a particular beacon device (e.g., a unique tuple of battery type, transmission power, and transmission rate) to retrieve from the lookup table the total expected lifespan for the battery of the particular beacon device.

Further, the curves discussed herein can be modeled or otherwise expressed in various different units. As one example, the y-axis of the curves can be in units of battery voltage while the x-axis is in units of time. As another example, the y-axis of the curves can be in units of battery voltage while the x-axis is in units of total number of frames transmitted by the corresponding beacon device. Thus, the total expected lifespan, current expended operational lifespan, and the expected remaining lifespan of a power source can be expressed in units of time, number of frames transmitted, or other parameters.

Other aspects of the present disclosure are directed to discovery of unexpected beacon devices based on received observation reports (e.g., finding new beacon devices); determining location of a mobile computing device based on beacon device observation; and refinement of location data for points of interest based on determination of beacon device location.

In some implementations, in order to obtain the benefits of the techniques described herein, the user may be required to allow the collection and analysis of mobile device location information and/or other data associated with the user or the user's mobile computing device. Therefore, in some implementations, users may be provided with an opportunity to adjust settings that control whether and how much the systems of the present disclosure collect and/or analyze such information. However, if the user does not allow collection and use of such information, then the user may not receive the benefits of the techniques described herein. In addition, in some embodiments, certain information or data can be treated in one or more ways before or after it is used, so that personally identifiable information is removed or not stored permanently.

Referring now to the Figures, example embodiments of the present disclosure will be discussed in further detail, one or more examples of which are illustrated in the drawings. Each example is provided by way of explanation of the present disclosure, not limitation of the present disclosure.

Example Systems for Beacon Device Fleet Management

FIG. 1 depicts an example system 100 to enable beacon device fleet management according to an example embodiment of the present disclosure. System 100 includes a plurality of beacon devices 102-106; one or more mobile computing devices 112 and 114; a fleet management system 120; and a fleet owner computing device 130. The one or more mobile computing devices 112 and 114, the fleet management system 120, and the fleet owner computing device 130 are communicatively coupled over a network 140.

The beacon devices 102-106 can be used for many different applications, including, for example, co-presence (e.g., two entities becoming aware of each other), location-based gaming, asset tracking, beacon device localization or mobile computing device localization, telemetry (e.g., temperature reporting), information provisioning (e.g., use of a mobile computing device to obtain various information such as semantic information or geographic information associated with beacon devices 102-106 as the mobile computing device moves about the world), intra-beacon communication, payment systems, security, etc. The present disclosure provides a general system that can be applicable to the above noted applications or other applications as well. More particularly, the present disclosure provides systems and methods for beacon device fleet management within the context of any of the above applications.

The beacon devices 102-106 each include one or more processors 107 and a memory 108. The processor 107 can be any processing device such as a controller, microcontroller, microprocessor, ASIC, or other processing device and can be one processor or a plurality of processors that are operatively connected.

The memory 108 can store instructions that, when implemented by the one or more processors 107, cause the one or more processors to perform operations to provide functionality. The memory 108 can also store various data, including an identifier associated with the beacon device.

The beacon devices 102-106 also each include a power source 109 and a transmitter 110. The power source 109 can be, for example, one or more of various types of batteries. The beacon devices 102-106 can include various other components such as sensors, as well. In such instances, the memory 108 can store data collected by such sensors.

Beacon devices 102-106 can be computing devices that are configured to emit messages or other signals. For example, the messages can be advertising frames that are broadcast by the beacon devices 102-106. The advertising frames can include various information, including, for example, an identifier that uniquely identifies the broadcasting beacon device; current power source characteristics (e.g., state of charge and/or power source voltage); temperature; total number of frames broadcast; initialization date; battery type; transmission rate; transmission power; a URL; and/or other various information. In some instances, the beacon device broadcasts only its unique identifier.

In some implementations, the advertising frames can be used for the purpose of being "noticed" but not connected to. Thus, in such implementations, the entirety of the interaction between the beacon devices 102-106 and the mobile computing devices 112 and 114 can be performed without requiring a connection between the mobile computing device and the beacon device or a connection between the beacon device and the fleet management system 120. Instead, all relevant information for the interaction is contained within the advertising packets emitted by the beacon device. Limiting beacon device interaction to the broadcasting of advertising frames can provide a nominal behavior that allows energy consumption and service life to be modeled and reasonably predicted.

In other implementations, however, the beacon devices 102-106 can allow connections for configuration, provisioning, maintenance, firmware updates, or other functions. In yet further implementations, the beacon devices 102-106 can be configured to provide additional information to a mobile computing device using a scan request and scan response interaction, which does not require actual connection between the devices.

The beacon devices 102-106 can broadcast the advertising frames using short range wireless communication technologies such as, for example, Bluetooth, Bluetooth low energy, ZigBee, Near Field Communication, Wi-Fi Direct, or other technologies. Furthermore, although short range wireless communication technologies are provided as an example, any communication method can be used to transmit the advertising frames from the beacon devices 102-106 to the mobile computing devices 112 and 114, including, for example, wired connections, general radio frequency communication, optical communication, infrared communication, magnetic communication, or other communication methods, including, for example, quantum communication methods.

Broadcasting of advertising frames can be the primary purpose of each beacon device 102-106 or can be a secondary purpose. Thus, in various implementations of the present disclosure, each beacon device can be a computing device dedicated to periodic broadcasting of advertising frames; an embedded system within a larger computing device or system; other devices; or combinations thereof.

Each of the beacon devices 102-106 can be provided with an identifier at the time of provisioning. As one example, each identifier can be based in whole or in part on a Universally Unique Identifier (UUID).

Mobile computing devices 112 and 114 can be computing devices configured to receive advertising frames from each of beacon devices 102-106. As example, mobile computing devices 112 and 114 can be user computing devices such as a smartphone, a laptop, a tablet computing device, or a wearable computing device; an embedded system on a machine; a navigational device; or combinations thereof.

Each mobile computing device 112 and 114 includes one or more processors 115 and a memory 116. The memory 116 stores instructions which, when executed by the processors 115, cause the mobile computing device 112 to perform desired functions.

[1] Each of the mobile computing devices 112 and 114 includes a positioning system 118. Positioning system 118 can determine a current geographic location of mobile computing device 112 and communicate such geographic location to the fleet management system 120 over network 140, as discussed further below. The positioning system 118 can be any device or circuitry for analyzing the position of the mobile computing device 112. For example, the positioning system 118 can determine actual or relative position by using a satellite navigation positioning system (e.g., a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi_33 hotspots, and/or other suitable techniques for determining position or combinations thereof.

[2] In the instance in which the user consents to the use of positional or location data, the positioning system 118 can analyze the position of the mobile computing device 112 as the user moves around in the world and provides the current location of mobile computing device 112 to the fleet management system 120 over network 140 in the form of a plurality of observation reports, as discussed further below.

Each of the mobile computing devices 112 and 114 includes a beacon scanner 118 that scans for or otherwise receives information broadcast by beacon devices 102-106. The beacon scanner 118 can be implemented at an operating system level, an application level, or combinations thereof. For example, portions of beacon scanning functionality can be performed by a maps application.

The beacon scanner 118 includes computer logic utilized to provide desired functionality. Thus, the beacon scanner 118 can be implemented in hardware, firmware and/or software controlling a general purpose processor. In one embodiment, the beacon scanner 118 includes program code files stored on the storage device, loaded into memory and executed by a processor or can be provided from computer program products, for example, computer executable instructions that are stored in a tangible computer-readable storage medium such as RAM hard disk or optical or magnetic media.

As one example, the beacon scanner 118 can include a system on a chip (SoC) that performs low-power background scans for advertising frames, batches observed advertising frames, and performs periodic bulk-transfers to the fleet management system 120 to improve energy efficiency.

According to an aspect of the present disclosure, the mobile computing device 112 can continuously or periodically upload or otherwise transmit a plurality of observation reports to the fleet management system 120. Each observation report can indicate a location of the mobile computing device 112 and can identify any beacon devices 102-106 from which the mobile computing device 112 has recently received a broadcast (e.g., within the last second).

In some instances, the mobile computing device 112 can transmit an observation report that indicates the current location of the mobile computing device 112 and indicates that the mobile computing device 112 has not recently received any broadcasts from beacon devices. In some instances, the observation report can include various additional data received from the identified beacon devices, including, for example, current power source characteristics (e.g., state of charge and/or power source voltage); temperature; total number of frames broadcast; initialization date; battery type; transmission rate; transmission power; a URL; and/or other various information broadcast by a beacon device.

The fleet management system 120 can be one or more computing devices configured to communicate with the mobile computing devices 112 and 114 and the fleet owner computing devices 130 over the network 140. As an example, fleet management system 120 can be one or more server computing devices. In the instance that a plurality of server computing devices are used, the server computing devices can be arranged according to any suitable computing architecture, including sequential computing architectures, parallel computing architectures, or combinations thereof.

The fleet management system 120 includes one or more processors 121 and a memory 122. The memory 122 stores instructions 124 which, when executed by the processors 121, cause the fleet management system 120 to perform desired functions. The memory 122 also stores various types of data 123.

The fleet management system 120 includes a dashboard controller 125, a beacon device locator 126, a battery life evaluator 127, and a detection interval calculator 128. Each of the dashboard controller 125, the beacon device locator 126, the battery life evaluator 127, and the detection interval calculator 128 include computer logic utilized to provide desired functionality. Thus, each of the dashboard controller 125, the beacon device locator 126, the battery life evaluator 127, and the detection interval calculator 128 can be implemented in hardware, firmware and/or software controlling a general purpose processor. In one embodiment, each of the dashboard controller 125, the beacon device locator 126, the battery life evaluator 127, and the detection interval calculator 128 includes program code files stored on the storage device, loaded into memory and executed by a processor or can be provided from computer program products, for example, computer executable instructions that are stored in a tangible computer-readable storage medium such as RAM hard disk or optical or magnetic media.

The fleet management system 120 can implement the dashboard controller 125 to provide a dashboard for display by the fleet owner computing device 130. The dashboard controller 125 can receive a device status request from the fleet owner computing device 130, retrieve the appropriate information (e.g., various beacon device operational statuses), and provide for transmission of such information to the fleet owner computing device 130. As one example, the fleet management system 120 can implement the dashboard controller 125 to perform aspects of method 300 of FIG. 3 and/or method 700 of FIG. 7.

The fleet management system 120 can implement the beacon device locator 126 to determine a location status for each of a plurality of beacon devices. For example, the beacon device locator 126 can be implemented to determine a current location of a beacon device, for example, by performing one or more clustering techniques on a plurality of observation reports. As one example, the fleet management system 120 can implement the beacon device locator 126 to perform aspects of method 500 of FIGS. 5A and 5B and/or method 600 of FIG. 6.

The fleet management system 120 can implement the battery life evaluator 127 to determine a power source status for each of a plurality of beacon devices. For example, the battery life evaluator 127 can be implemented to fit a curve that approximates a third order polynomial to battery life data points collected for at least one of a first beacon device and a plurality of other beacon devices which share one or more energy consumption characteristics with the first beacon device. The battery life evaluator 127 can be implemented to determine a total expected lifespan for one or more batteries based on one or more fitted curves that approximates a third order polynomial. As examples, the fleet management system 120 can implement the battery life evaluator 127 to perform aspects of method 700 of FIG. 7, method 800 of FIG. 8, method 900 of FIG. 9, and/or method 1000 of FIG. 10.

Fleet management system 120 can implement the detection interval calculator 128 to dynamically determine a detection interval for each of a plurality of beacon devices. For example, the detection interval calculator 128 can be implemented to dynamically determine the detection interval for a particular beacon device based on an observation frequency at which mobile computing devices 112 and 114 have historically observed the particular beacon device. As one example, the fleet management system 120 can implement the detection interval calculator 128 to perform aspects of method 400 of FIG. 4.

Fleet management system 120 can be coupled to or in communication with a beacon device information database 129. Although database 129 is depicted in FIG. 1 as external to the fleet management system 120, such database 129 can be included in memory 122 of the fleet management system 120. Further, database 129 can correspond to a plurality of databases rather than a single data source.

Beacon device information database 129 can store various information regarding each of the beacon devices. For example, beacon device information database 129 can store a plurality of observation reports for each of the beacon devices 102-106. As another example, the beacon device information database 129 can store current operational statuses for each of the beacon devices 102-106.

Figure 2:
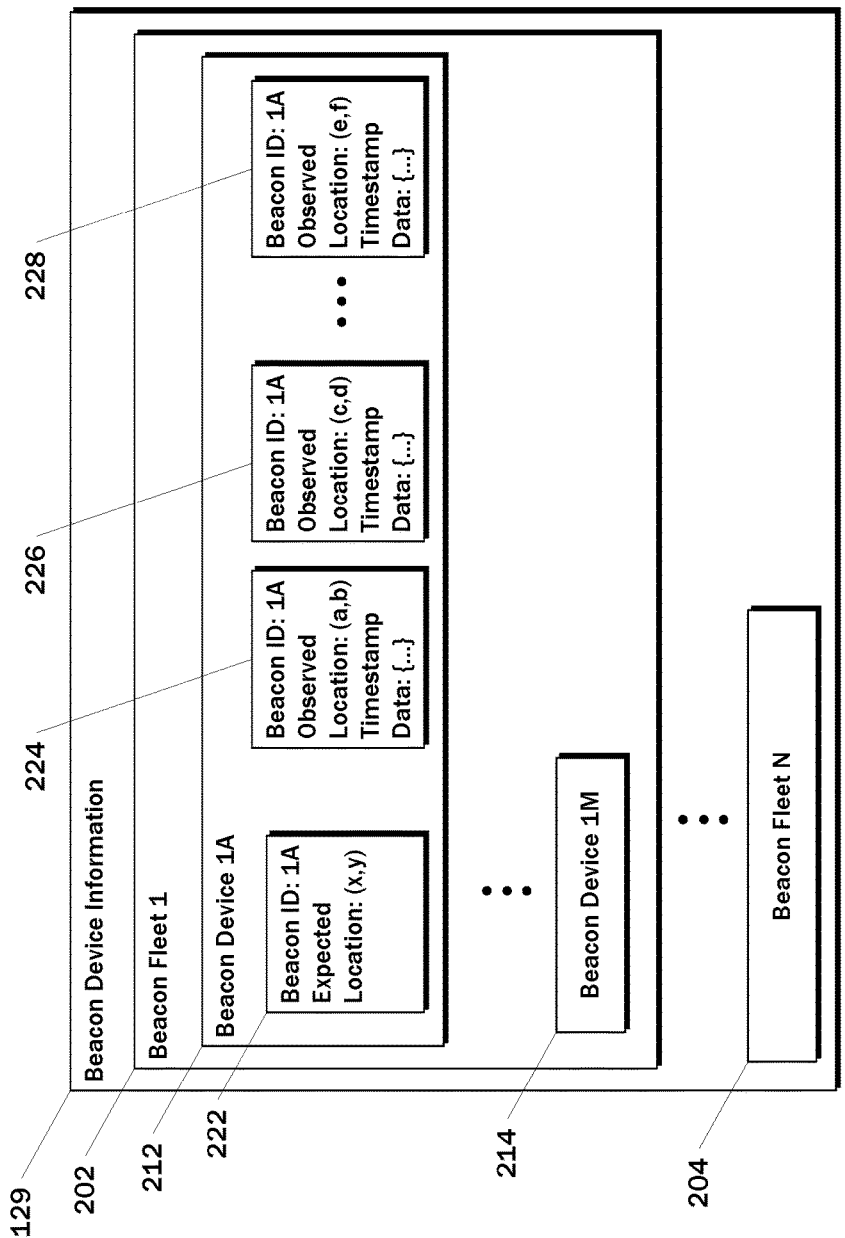
FIG. 2 depicts an example data structure of an example beacon device information database according to an example embodiment of the present disclosure.

As one example, FIG. 2 depicts an example data structure of beacon device information database 129. The database 129 can include information for each of a plurality of fleets of beacon devices. For example, the database 129 is illustrated as including data for a first beacon fleet 202 through an Nth beacon fleet 204. Each fleet of beacon devices can include one or more beacon devices. For example, the first beacon fleet 202 is illustrated as including data for a first beacon device 212 through an Mth beacon device 214.

For each beacon device, the database 129 can store an expected location and a plurality of observation reports. For example, for the first beacon device 212 the database 129 includes an entry 222 that describes an expected location of the first beacon device 212. The expected location can be expressed as geographic coordinates (e.g., latitude and longitude) or can be expressed in other formats (e.g., "southwest corner of the first floor of a particular point of interest"). In addition, for the first beacon device 212 the database 129 includes a plurality of entries 224-228 for respective observation reports that describes a location at which a mobile computing device observed the beacon device 212. The location of each entry 224-228 can be expressed as geographic coordinates or in other formats. Each of the entries 224-228 can also include a timestamp respective timestamps and respective data included in the observation report (e.g., battery life data points such as battery voltage data, telemetry data, etc.).

The database 129 can also store additional information not illustrated in FIG. 2 (e.g., current operational statuses for each beacon device).

Referring again to FIG. 1, fleet owner computing device 130 can be any computing device capable of communicating with fleet management system 120 over network 140. For example, fleet owner computing device 130 can be a user computing device, a desktop computing device, a server computing device, or other computing devices.

The fleet owner computing device 130 includes one or more processors 131 and a memory 132. The memory 132 stores instructions 134 which, when executed by the processors 131, cause the fleet owner computing device 130 to perform desired functions. The memory 132 also stores various types of data 133.

As one example, the memory 132 can store instructions 134 which, when executed by the processors 131, cause the fleet owner computing device to operate a browser application. The browser application can communicate with the dashboard controller 125 to request and receive information regarding one or more beacon devices (e.g., displayed in a dashboard user interface).

In some implementations, the fleet owner computing device 130 can communicate with the fleet management system 120 using an application programming interface (API). For example, in some implementations, the fleet owner computing device 130 can directly retrieve Beacon device information from the beacon device information database 129 using the application programming interface.

Fleet owner computing device 130 can also include a display 135. The display 135 can include any one or more of various display technologies.

Network 140 can be any type of communications network, such as a local area network (e.g., intranet), wide area network (e.g., Internet), or some combination thereof and can include any number of wired or wireless links. In general, communication between the fleet management system 120 and mobile computing devices 112 and 114 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Furthermore, although each mobile computing device 112 and 114 is shown as communicating directly with the fleet management system 120 over network 140, there may be any number of intervening devices between the mobile computing device 112 or 114 and the fleet management system 120. As an example, in some embodiments, groups of mobile computing devices can be organized in a network (e.g., a mesh network) and can relay messages from a particular mobile computing device to the fleet management system 120.

Example Methods to Enable Beacon Device Fleet Management

Figure 3:
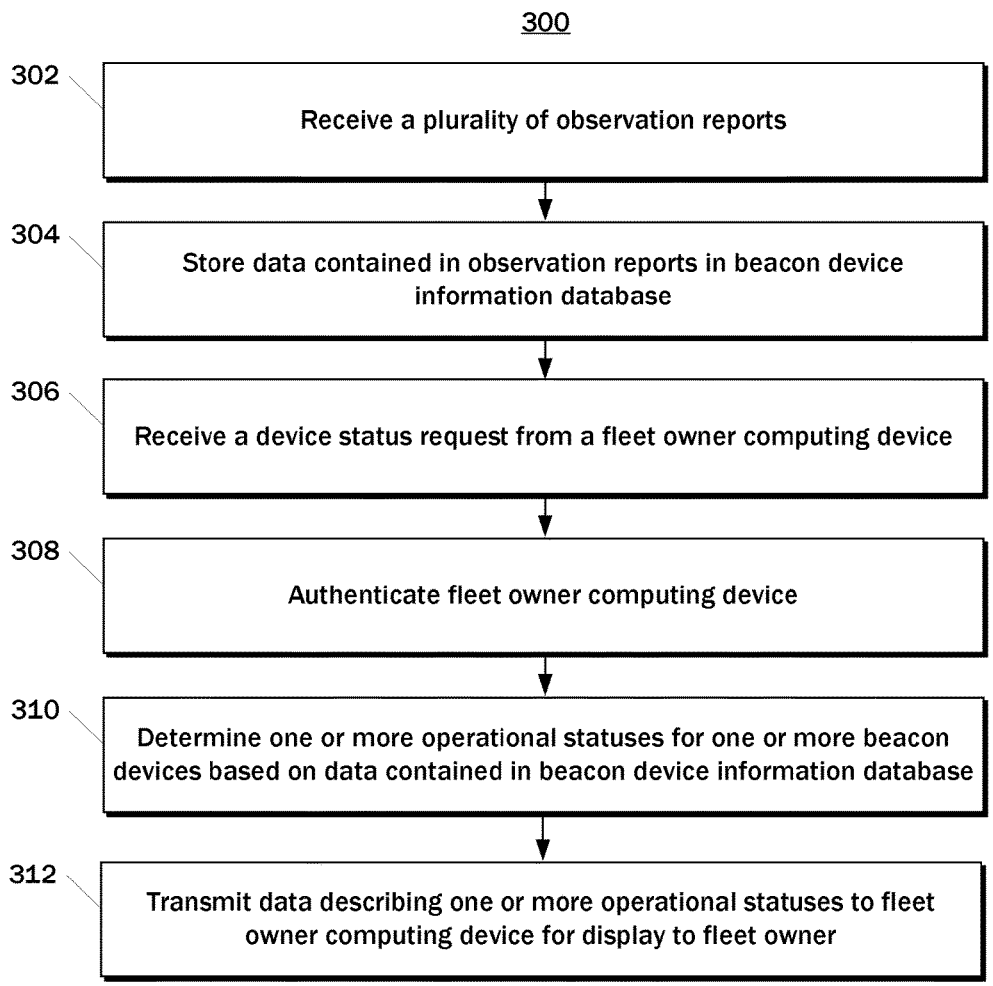
FIG. 3 depicts a flow chart diagram of an example method to enable beacon device fleet management according to an example embodiment of the present disclosure.

FIG. 3 depicts a flow chart diagram of an example method 300 for enabling beacon device fleet management. While example method 300 will be discussed with reference to the system 100 of FIG. 1, method 300 can be implemented using any suitable computing system.

At 302, the fleet management system 120 and receives a plurality of observation reports from the mobile computing devices 112 and 114. At 304, the fleet management system 120 stores the data contained in the observation reports in the beacon device information database 129.

At 306, the fleet management system 120 receives a device status request from the fleet owner computing device 130. The device status request can request the status of one or more beacon devices or can simply identify an entire fleet.

At 308, the fleet management system 120 authenticates the fleet owner computing device 130. For example, password or other authentication technology can be used to authenticate the fleet owner.

At 310, the fleet management system 120 determines one or more operational statuses for one or more beacon devices based on data contained in the beacon device information database 129. For example, the operational statuses can include a detection status, a location status, a power source status, or other operational parameters.

At 312, the fleet management system 120 transmits data describing the one or more operational statuses to the fleet owner computing device 134 for display to the fleet owner.

For example, the operational statuses and/or other analytics can be provided to the fleet owner on a dashboard style user interface.

In some implementations, when a location status of a beacon device (e.g., a current location of the beacon device) is provided to the fleet owner, no information is provided regarding the observation locations included in the observation reports, thereby enhancing the privacy of the users of the mobile computing devices 112 and 114.

Example Methods to Determine a Beacon Device Detection Status

Figure 4:
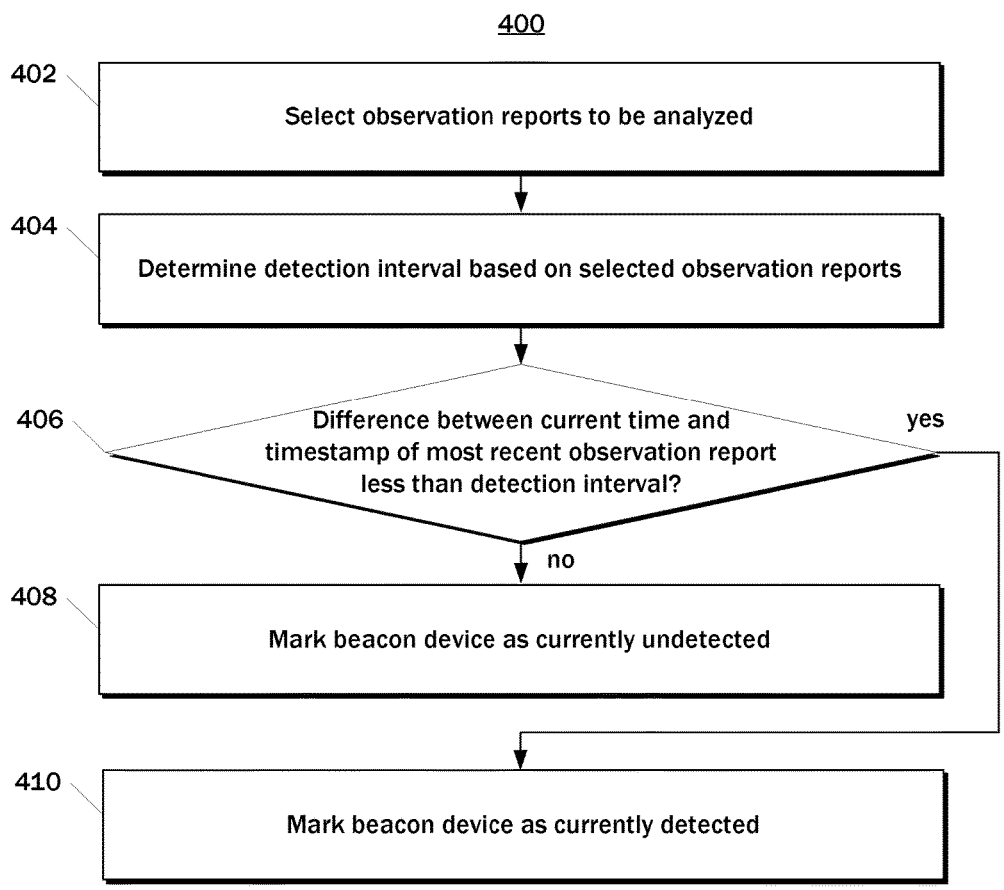
FIG. 4 depicts a flow chart diagram of an example method to determine a detection status of a beacon device according to an example embodiment of the present disclosure.

FIG. 4 depicts a flow chart diagram of an example method to determine a detection status of a beacon device. While example method 400 will be discussed with reference to the system 100 of FIG. 1, method 400 can be implemented using any suitable computing system.

At 402, the fleet management system 120 selects a set of observation reports to be analyzed. For example, the selected set of observation reports can include some predetermined number of the most recent observation reports. As another example, the selected set of observation reports can include all observation reports received within some predetermined window of time.

At 404, the fleet management system 120 determines a detection interval based on the selected set of observation reports. In particular, the detection interval can be a dynamically determined amount of time that can be based at least in part on a historical observation frequency at which the particular beacon device has been observed by mobile computing devices in the past.

For example, if the particular beacon device has been relatively frequently observed in the past, then a shorter detection interval can be dynamically determined for the beacon device at 404. Likewise, if the particular beacon device has been relatively infrequently observed in the past, then a longer detection interval can be determined for the beacon device at 404.

At 406, the fleet management system 120 determines whether a difference between a current time and a timestamp of a most recent observation report is less than the detection interval. If it is determined at 406 that the difference between the current time and the timestamp of the most recent observation report is not less than the detection interval, then method 400 proceeds to 408. At 408, the fleet management system 120 marks the beacon device as currently undetected.

However, if it is determined at 406 that the difference between the current time and the timestamp of the most recent observation report is less than the detection interval, then method 400 proceeds to 410. At 410, the fleet management system 120 marks the beacon device as currently detected.

The beacon device owner can retrieve or otherwise request and receive the detection status from the fleet management system 120. As another example, the fleet management system 120 can continuously and/or periodically determine the detection status of each beacon device. When the detection status of a particular beacon device changes from currently detected to not currently detected, the fleet management system 120 can send an alert (e.g., message) to the beacon device owner that indicates that the particular beacon device may be dead, missing, broken, damaged, and/or otherwise not currently broadcasting or otherwise properly operating.

Example Methods to Determine a Beacon Device Location Status

Figure 5A:
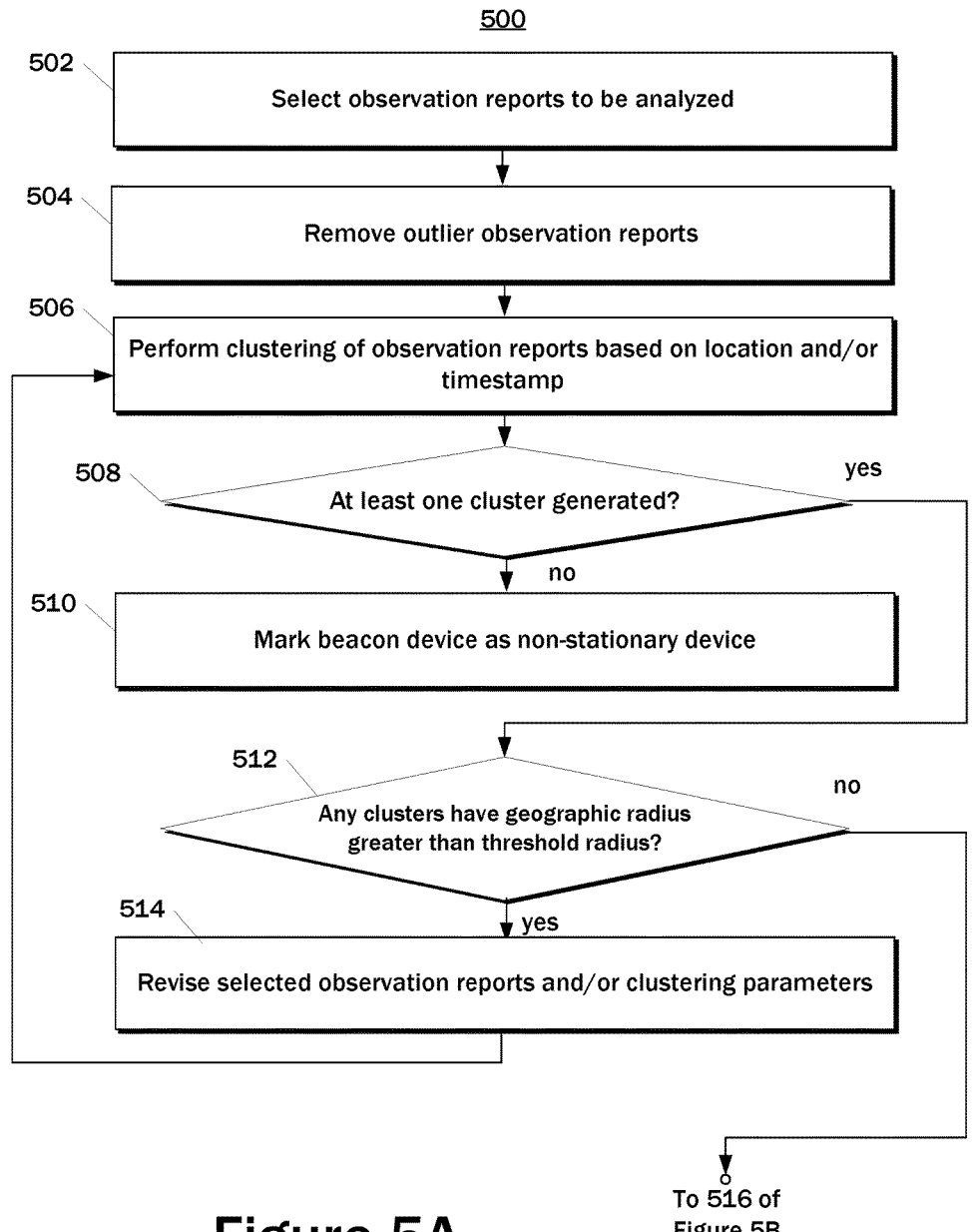
FIGS. 5A and 5B depict a flow chart diagram of an example method to determine a location status of a beacon device according to an example embodiment of the present disclosure.
Figure 5B:
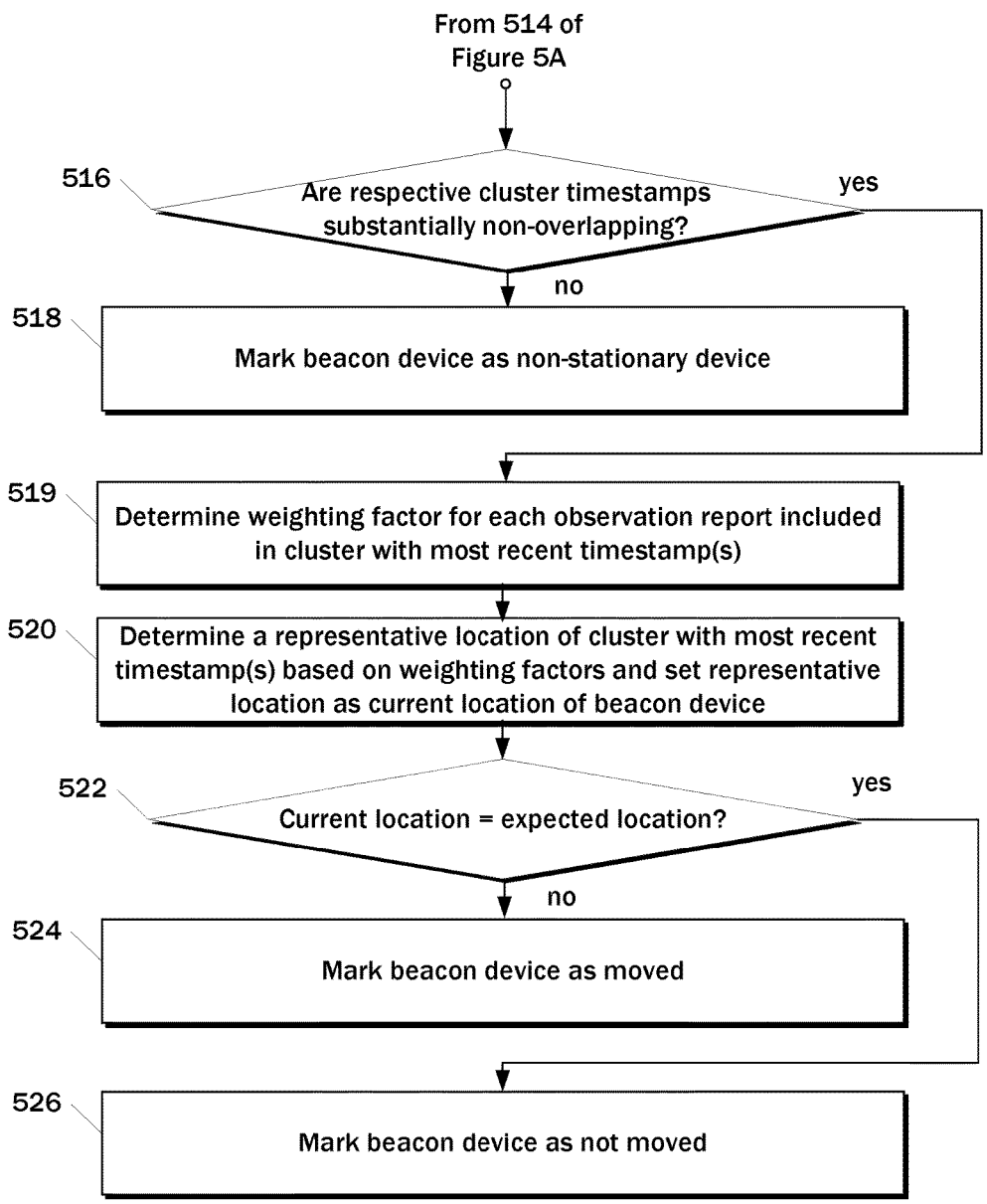

FIGS. 5A and 5B depict a flow chart diagram of an example method 500 to determine a location status of a beacon device. While example method 500 will be discussed with reference to the system 100 of FIG. 1, method 500 can be implemented using any suitable computing system.

Referring first to FIG. 5A, at 502, the fleet management system 120 selects a set of observation reports to be analyzed. For example, the selected set of observation reports can include some predetermined number of the most recent observation reports. As another example, the selected set of observation reports can include all observation reports received within some predetermined window of time.

At 504, the fleet management system 120 removes any outlier observation reports. At 506, the fleet management system 120 clusters the set of selected observation reports based on location and/or timestamp. Example clustering techniques include the OPTICS technique and the k-means clustering technique.

At 508, the fleet management system 120 determines whether at least one suitable cluster was generated. If it is determined at 508 that at least one suitable cluster was not generated, then method 500 proceeds to 510.

At 510, the fleet management system marks the beacon device as a non-stationary device. In some instances, a beacon device marked as a non-stationary device can also be marked as not being a suitable source of location data.

However, if it is determined at 508 that at least one suitable cluster was generated, then method 500 proceeds to 512. At 512, the fleet management system 120 determines whether any of the clusters have a geographic radius that is greater than a threshold radius.

If it is determined at 512 that at least one of the clusters has a geographic radius that is greater than a threshold radius, then method 500 proceeds to 514.

At 514, the fleet management system 120 revises the set of selected observation reports and/or revises one or more parameters of the clustering technique or algorithm. For example, a granularity of the clustering algorithm can be adjusted. After 514, method 500 returns to 506 and performs the clustering algorithm with respect to the revised set of selected observation reports and/or according to the revised parameters.

However, referring again to 512, if it is determined that none of the clusters have a geographic radius greater than the threshold radius, then method 500 proceeds to 516 of FIG. 5B.

Referring now to FIG. 5B, at 516, the fleet management system 120 determines whether the respective timestamps of the one or more clusters are substantially non-overlapping. For example, if two clusters have more than a threshold number of timestamps that are interleaved, then the clusters may be said to not be substantially non-overlapping.

If it is determined at 516 that the respective timestamps of the one or more clusters are not substantially non-overlapping, then method 500 proceeds to 518. At 518, the fleet management system 120 marks the beacon device as a non-stationary device.

However if it is determined at 516 that the respective timestamps of the one or more clusters are substantially non-overlapping, then method 500 proceeds to 519.

At 519, the fleet management system 120 determines a weighting factor for each observation report included in the cluster with the most recent timestamps. As one example, the weighting factors can be determined based on an accuracy radius provided by mobile computing devices 112 and 114 within or along with the each observation report. For example, the mobile computing device 112 or the fleet management system 120 can determine the accuracy radius for the location described by a particular observation report based on data used by the mobile computing devices to determine its location. For example, various means of determining location (e.g., GPS versus cell triangulation) can result in the correspondingly determined locations receiving different accuracy radiuses.

Generally, a larger accuracy radius indicates that the corresponding location provided by the observation report is less accurate and, therefore, the observation report can be assigned a relatively smaller weighting factor so as to have a relatively smaller impact on the location of the representative location of the cluster. Likewise, an observation report with a relatively smaller accuracy radius can receive a relatively larger weighting factor.

As another example, the weighting factors can be based on a plurality of reliability factors respectively associated with the plurality of mobile computing devices 112 and 114. Thus, the weighting factor assigned to a particular observation report can be dependent upon the reliability factor associated with the particular mobile computing device 112 or user of such mobile computing device 112 from which such particular observation report was received. For example, the reliability factor associated with a particular mobile computing device 112 can be indicative of a historical reliability of observation reports provided by such mobile computing device 112.

At 520, the fleet management system 120 determines a representative location of the cluster with the most recent timestamps and sets the representative location of the cluster as a current location of the beacon device. As one example, the representative location can be a weighted centroid of the cluster based on the weighting factors and the locations of the observation reports included in the cluster.

At 522, the fleet management system 120 determines whether the current location of the beacon device matches an expected location of the beacon device.

If it is determined at 522 that the current location of the beacon device does not match the expected location of the beacon device, the method 500 proceeds to 524. At 524, the fleet management system 120 marks of the beacon device as moved.

However, if it is determined at 522 that the current location of the beacon device matches the expected location of the beacon device, the method 500 proceeds to 526. At 526, the fleet management system 120 marks of the beacon device as not moved.

Figure 6:
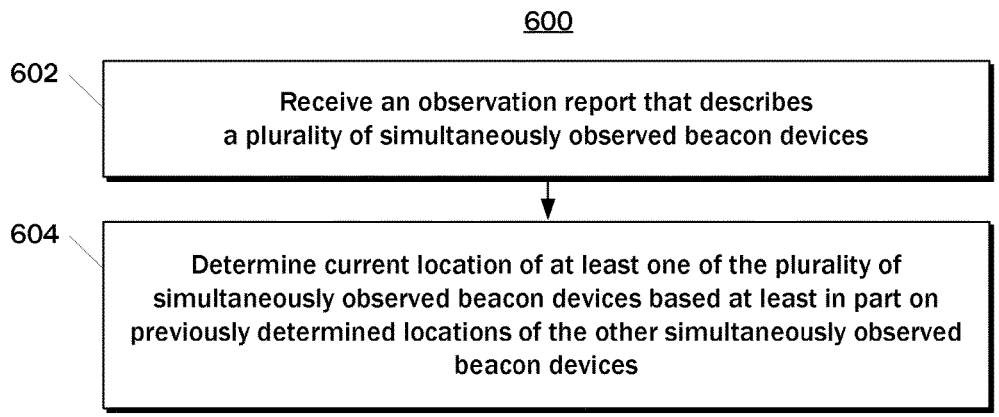
FIG. 6 depicts a flow chart diagram of an example method to determine a current location of a beacon device according to an example embodiment of the present disclosure.

FIG. 6 depicts a flow chart diagram of an example method 600 to determine a current location of a beacon device. While example method 600 will be discussed with reference to the system 100 of FIG. 1, method 600 can be implemented using any suitable computing system.

At 602, the fleet management system 120 receives an observation report that describes a plurality of simultaneously observed beacon devices.

At 604, the fleet management system 120 determines a current location of at least one of the plurality of simultaneously observed beacon devices based at least in part on respective previously determined locations of the other simultaneously observed beacon devices.

As one example, the fleet management system 120 can generate one or more simulated observation reports based at least in part on the one or more observation reports that identify the plurality of simultaneously observed beacon devices. Each of the one or more simulated observation reports can describe an additional observation location determined based at least in part on the respective current locations of the plurality of simultaneously observed beacon devices. For example, the additional observation locations can be the current location(s) of the simultaneously observed beacon devices or can be some weighted average of the location indicated by the observation report and the current location(s) of the simultaneously observed beacon devices.

To provide an example, a first authentic observation report may indicate that a mobile computing device simultaneously observed beacon devices A, B, and C while the mobile computing device was located at location X. To assist in determining the current location of beacon device A, the first authentic observation report of location X can be stored for beacon device A. In addition, a first simulated observation report can be stored for beacon device A, where the location indicated by the first simulated observation report is some weighted average of location X, the current location B of beacon device B, and the current location C of beacon device C. As another example, two simulated observation reports can be generated that respectively indicate the weighted average of location X and location B and the weighted average of location X and location C.

The simulated observation reports can be stored and associated with the beacon device A. All observation reports associated with the beacon device A (e.g., both authentic observation reports and simulated observation reports) can be used to determine the current location of beacon device A. For example, the clustering techniques described above can be applied to all observation reports.

As yet another example, instead of generating additional simulated observation reports, the fleet management system can modify the respective locations described by the observation reports that identify simultaneously observed beacon devices. Thus, to continue the example provided above, instead of generating one or more simulated observation reports, the fleet management system can modify the location indicated by the first authentic observation report (e.g., location X) to some weighted average of location X, location B, and location C. Thus, the present disclosure contemplates various techniques which leverage observation reports that identify simultaneously observed beacon devices to determine or refine the location of the observed beacon devices.

Example Methods to Determine and Provide a Beacon Device Power Source Status

Figure 7:
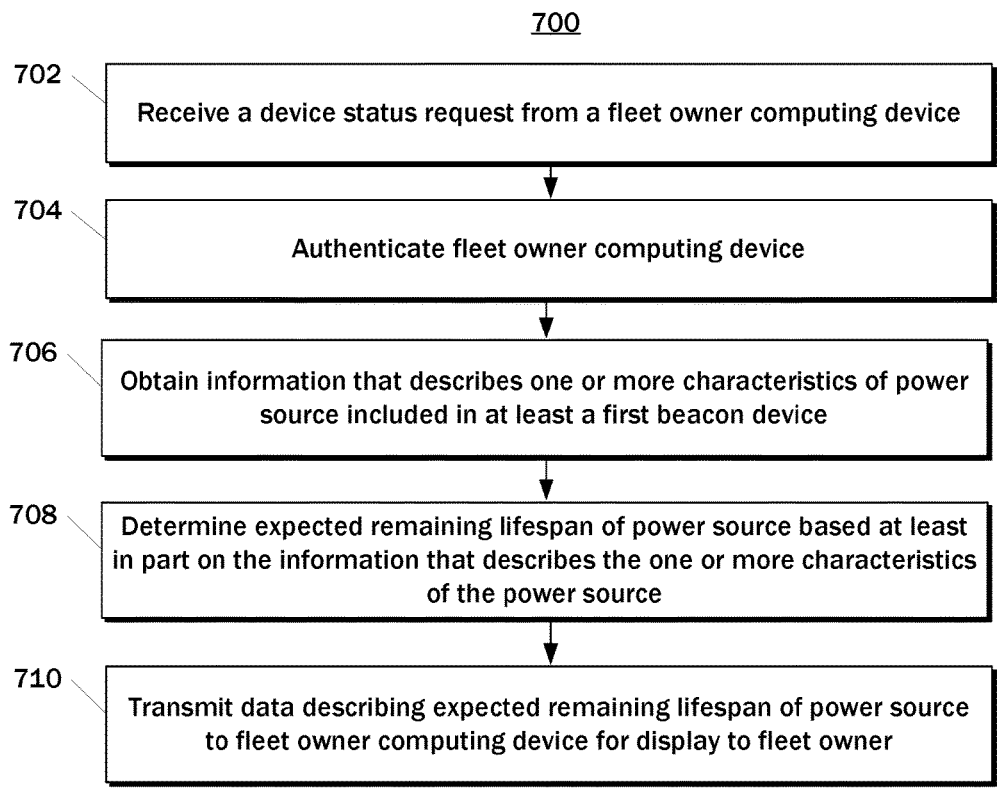
FIG. 7 depicts a flow chart diagram of an example method to enable beacon device fleet management according to an example embodiment of the present disclosure.

FIG. 7 depicts a flow chart diagram of an example method 700 to enable beacon device fleet management. While example method 700 will be discussed with reference to the system 100 of FIG. 1, method 700 can be implemented using any suitable computing system.

At 702, the fleet management system 120 receives a device status request from the fleet owner computing device 130. At 704, the fleet management system 120 authenticates the fleet owner computing device 130.

At 706, the fleet management system 120 obtains information that describes one or more characteristics of a power source included in at least a first beacon device. For example, the one or more characteristics can include a battery type, a transmission rate, and a transmission power.

At 708, the fleet management system 120 determines an expected remaining lifespan of the power source based at least in part on the information that describes one or more characteristics of the power source.

At 710, the fleet management system 120 transmits data that describes the expected remaining lifespan of the power source to the fleet owner computing device 130 for display to the fleet owner.

Figure 8:
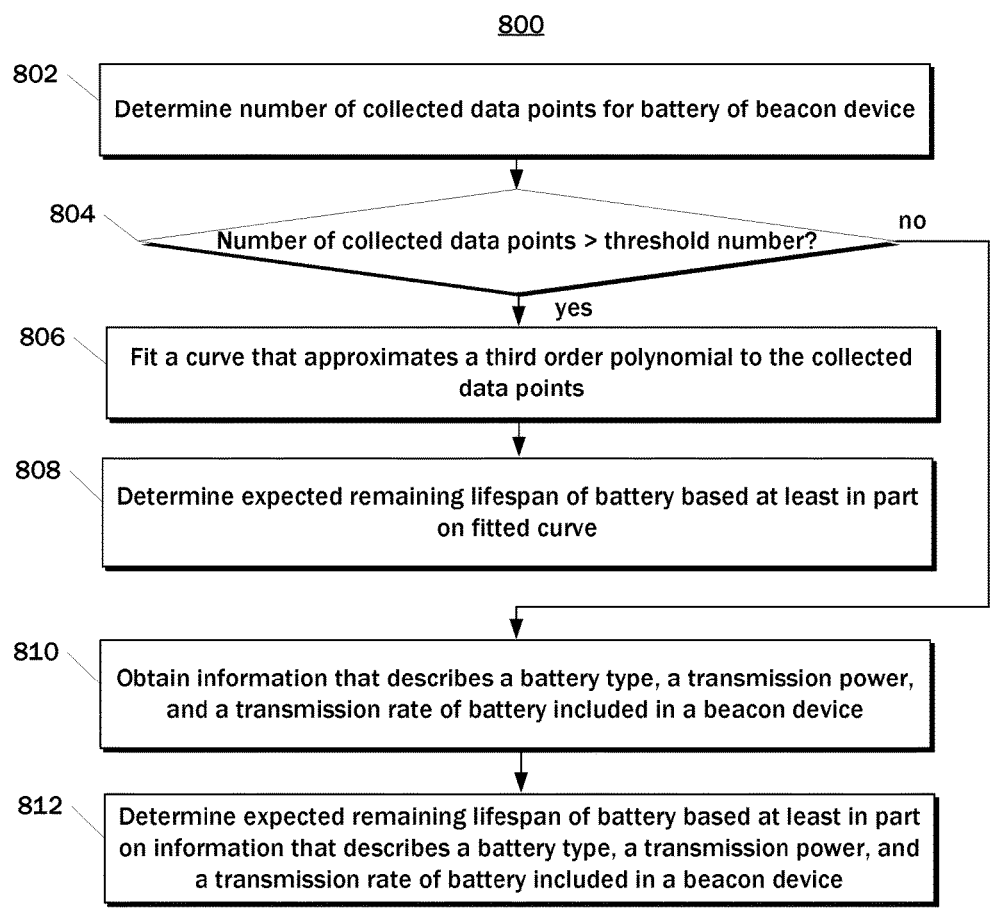
FIG. 8 depicts a flow chart diagram of an example method to determine an expected remaining lifespan of a battery according to an example embodiment of the present disclosure.

FIG. 8 depicts a flow chart diagram of an example method 800 to determine an expected remaining lifespan of a battery. While example method 800 will be discussed with reference to the system 100 of FIG. 1, method 800 can be implemented using any suitable computing system.

At 802, the fleet management system 120 determines a number of collected data points for a battery of a beacon device. The data points can describe various battery operational parameters, including, for example, state of charge and/or battery voltage.

At 804, the fleet management system 120 determines whether the number of collected data points is greater than a threshold number. If it is determined at 804 that the number of collected data points is greater than the threshold number, then method 800 proceeds to 806.

At 806, the fleet management system 120 fits a curve that approximates a third order polynomial to the collected data points. In particular, the third order polynomial can have the following form:

$$-ax^3+bx^2+cx+d$$

At 808, the fleet management system 120 determines an expected remaining lifespan of the battery based at least in part on the fitted curve. For example, after the curve has been fitted, the data and curve can be used to extrapolate into the future to determine a time or number of transmitted frames at which the battery will no longer properly power the beacon device.

However, referring again to 804, if it is determined that the number of collected data points is not greater than the threshold number, then method 800 proceeds to 810.

At 810, the fleet management system 120 obtains information that describes a battery type, a transmission power, and a transmission rate of the battery included in the beacon device.

At 812, the fleet management system 120 determines the expected remaining lifespan of the battery based at least in part on the information that describes the battery type, the transmission power, and the transmission rate of the battery included in the beacon device. For example, as described further below with reference to FIGS. 9 and 10, data points for other beacon devices that share the energy consumption characteristics can be used to predict the battery life from when the battery is first made operational.

Figure 9:
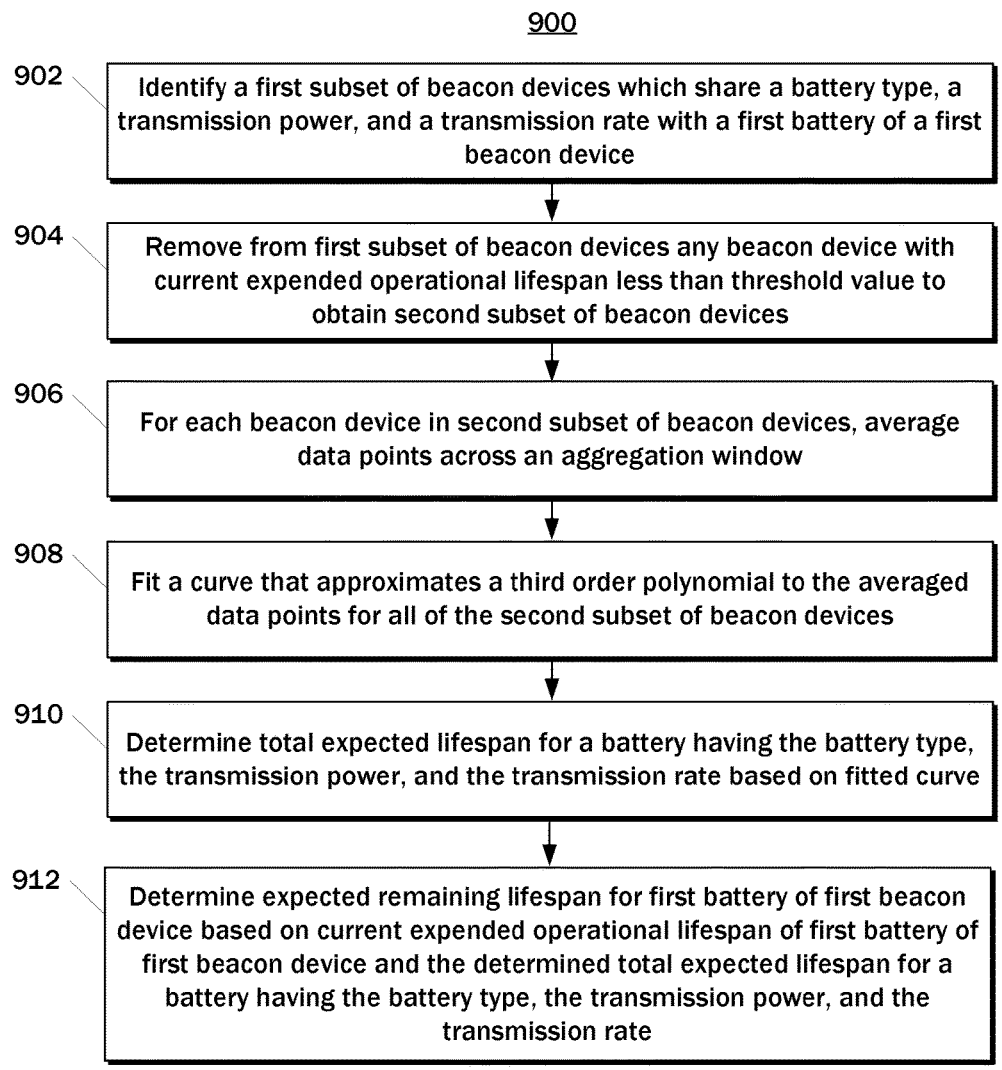
FIG. 9 depicts a flow chart diagram of an example method to determine an expected remaining lifespan of a battery according to an example embodiment of the present disclosure.

FIG. 9 depicts a flow chart diagram of an example method 900 to determine an expected remaining lifespan of a battery. While example method 900 will be discussed with reference to the system 100 of FIG. 1, method 900 can be implemented using any suitable computing system.

At 902, the fleet management system 120 identifies a first subset of beacon devices which share a battery type, a transmission power, and a transmission rate with a first battery of a first beacon device.

At 904, the fleet management system 120 removes from the first subset of beacon devices any beacon device with a current expended operational lifespan that is less than a threshold value to obtain a second subset of beacon devices.

At 906, the fleet management system 120 averages the data points for each beacon device in the second subset of beacon devices across an aggregation window. For example, the aggregation window can be one day. Thus, for each beacon device in the second subset of beacon devices, all data points for each day from such beacon device can be averaged.

At 908, the fleet management system 120 fits a curve that approximates the third order polynomial to the averaged data points for all of the second subset of beacon devices.

At 910, the fleet management system 120 determines a total expected lifespan for a battery having the battery type, the transmission power, and the transmission rate based on the fitted curve. For example, the x-axis value (e.g., number of days operational or number of transmitted frames) that corresponds to the critical low voltage point for the battery having the battery type, the transmission power, and the transmission rate is indicated by the fitted curve.

At 912, the fleet management system 120 determines the expected remaining lifespan for the first battery of the first beacon device based on a current expended operational lifespan of the first battery of the first beacon device and the determined total expected lifespan for a battery having the battery type, the transmission power, and the transmission rate. As one example, the current expended operational lifespan can be subtracted from the total expected lifespan to obtain the expected remaining lifespan.

Figure 10:
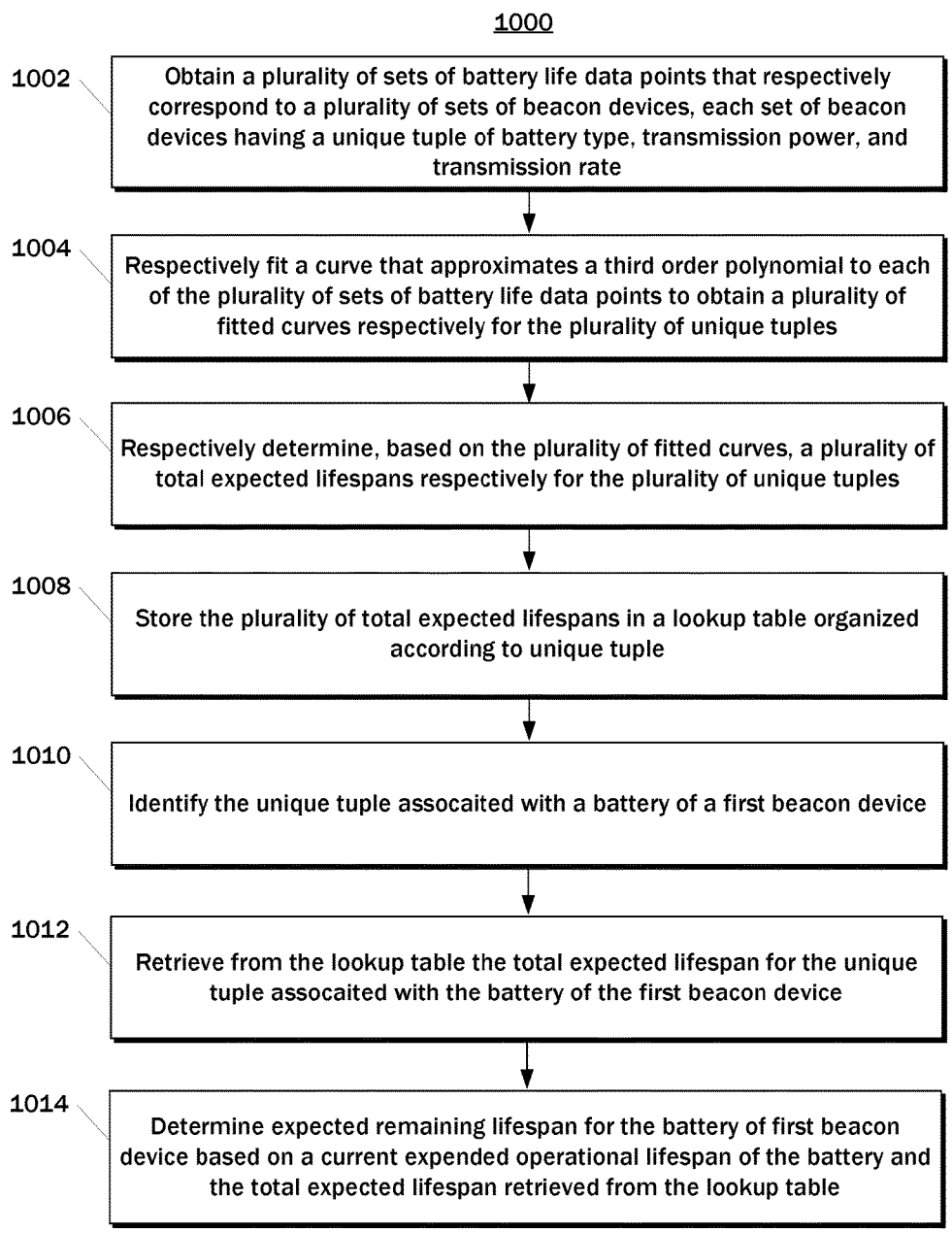
FIG. 10 depicts a flow chart diagram of an example method to determine an expected remaining lifespan of a battery according to an example embodiment of the present disclosure.

FIG. 10 depicts a flow chart diagram of an example method 1000 to determine an expected remaining lifespan of a battery. While example method 1000 will be discussed with reference to the system 100 of FIG. 1, method 1000 can be implemented using any suitable computing system.

At 1002, the fleet management system 120 obtains a plurality of sets of battery life data points that respectively correspond to a plurality of sets of beacon devices. Each set of beacon devices has a unique tuple of battery type, transmission power, and transmission rate.

At 1004, the fleet management system 120 respectively fits a curve that approximates a third order polynomial to each of the plurality of sets of battery life data points to obtain a plurality of fitted curves respectively for the plurality of unique tuples.

At 1006, the fleet management system 120 respectively determines, based on the plurality of fitted curves, a plurality of total expected lifespans respectively for the plurality of unique tuples.

At 1008, the fleet management system 120 stores of the plurality of total expected lifespans in a lookup table organized according to unique tuple.

At 1010, the fleet management system 120 identifies the unique tuple associated with a battery of a first beacon device.

At 1012, the fleet management system 120 retrieves from the lookup tables the total expected lifespan for the unique couple associated with the battery of the first beacon device.

At 1014, the fleet management system 120 determines an expected remaining lifespan for the battery of the first beacon device based on a current expended operational lifespan of the battery and the total expected lifespan retrieved from the lookup table.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

In addition, although FIGS. 3-10 respectively depict steps performed in a particular order for purposes of illustration and discussion, the methods of the present disclosure are not limited to the particularly illustrated order or arrangement. The various steps of the methods 300-1000 can be omitted, rearranged, combined, and/or adapted in various ways without deviating from the scope of the present disclosure.

What is claimed is:

1. A computer-implemented method to enable beacon device fleet management, the method comprising:

receiving, by a fleet management system, a plurality of observation reports respectively from a plurality of mobile computing devices, each observation report identifying at least one of a plurality of beacon devices observed by a reporting mobile computing device and describing at least a time at which the reporting mobile computing device observed the identified at least one beacon device;

analyzing, by the fleet management system, at least a portion of the plurality of observation reports that are associated with a first beacon device to determine a detection interval for the first beacon device, the detection interval comprising an amount of time that is based at least in part on a historical observation frequency at which the first beacon device has been observed by the mobile computing devices;

comparing, by the fleet management system, the detection interval of the first beacon device to a difference between a current time and a timestamp of a most recent observation report associated with the first beacon device; and determining, by the fleet management system, a detection status of the first beacon device based at least in part on the comparison of the detection interval of the first beacon device to the difference between the current time and the timestamp of the most recent observation report associated with the first beacon device, wherein the detection status is indicative of a current operation status of the first beacon device.

2. The computer-implemented method of claim 1, wherein the detection status of the first beacon device provides an indication of whether the first beacon device is actively broadcasting or not actively broadcasting.

3. The computer-implemented method of claim 1, wherein determining, by the fleet management system, the detection status comprises:

when the difference between the current time and the timestamp of the most recent observation report is greater than the detection interval, designating, by the fleet management system, the first beacon device as not currently detected; and when the difference between the current time and the timestamp of the most recent observation report is less than the detection interval, designating, by the fleet management system, the first beacon device as currently detected.

4. The computer-implemented method of claim 1, further comprising:
receiving, by the fleet management system from a fleet owner computing device, a device status request that requests an operational status of at least the first beacon device of the plurality of beacon devices; and
transmitting, by the fleet management system to the fleet owner computing device, data that describes at least the determined detection status of the first beacon device.

5. The computer-implemented method of claim 4, wherein said analyzing, comparing, and determining are performed in response to receipt of the device status request from the fleet owner computing device.

6. The computer-implemented method of claim 4, wherein transmitting, by the fleet management system to the fleet owner computing device, data that describes at least the determined detection status of the first beacon device comprises transmitting, by the fleet management system to the fleet owner computing device, data that further describes the timestamp of the most recent observation report.

7. The computer-implemented method of claim 4, wherein receiving, by the fleet management system from the fleet owner computing device, the device status request comprises receiving, by the fleet management system from the fleet owner computing device via an application programming interface, the device status request that requests the operational status of at least the first beacon device of the plurality of beacon devices.

8. The computer-implemented method of claim 1, wherein analyzing, by the fleet management system, at least the portion of the plurality of observation reports that are associated with the first beacon device to determine the detection interval for the first beacon device comprises:
selecting, by the fleet management system in real-time, the portion of the plurality of observation reports based at least in part on respective timestamps included in the plurality of observation reports;
determining, by the fleet management system in real-time, the historical observation frequency at which the first beacon device has been observed by mobile computing devices based at least in part on the selected portion of the plurality of observation reports; and
determining, by the fleet management system in real-time, the detection interval for the first beacon device based at least in part on the determined historical observation frequency.

9. The computer-implemented method of claim 8, wherein selecting, by the fleet management system in real-time, the portion of the plurality of observation reports based at least in part on respective timestamps included in the plurality of observation reports comprises selecting, by the fleet management system, only the portion of the plurality of observation reports that have timestamps included in a time window.

10. The computer-implemented method of claim 8, wherein selecting, by the fleet management system in real-time, the portion of the plurality of observation reports based at least in part on respective timestamps included in the plurality of observation reports comprises selecting, by the fleet management system, only a predefined number of the most recently received observation reports associated with the first beacon device.

11. The computer-implemented method of claim 1, further comprising:

detecting, by the fleet management system, a change in the detection status of the first beacon device from currently detected to not currently detected; and
in response to detection of the change in the detection status, transmitting, by the fleet management system, an alert to a fleet owner computing device that indicates the detected change in detection status of the first beacon device from currently detected to not currently detected.

12. The computer-implemented method of claim 1, wherein the first beacon device comprises a non-stationary beacon device.

13. A computing system, comprising: one or more processors; and
one or more non-transitory computer-readable media that collectively store instructions that, when executed by the one or more processors, cause the computing system to perform operations, the operations comprising:
receiving a plurality of observation reports respectively from a plurality of mobile computing devices, each observation report corresponding to an observation of a first beacon device by the reporting mobile device;
analyzing the plurality of observation reports to determine a detection interval for the first beacon device, the detection interval comprising an amount of time that is based at least in part on a historical observation frequency at which the first beacon device has been observed by the mobile computing devices;
comparing the detection interval of the first beacon device to a difference between a current time and a timestamp of a most recent observation report associated with the first beacon device; and
determining a detection status of the first beacon device based at least in part on the comparison of the detection interval of the first beacon device to the difference between the current time and the timestamp of the most recent observation report associated with the first beacon device, wherein the detection status is indicative of a current operation status of the first beacon device.

14. The computing system of claim 13, wherein the detection status of the first beacon device provides an indication of whether the first beacon device is actively broadcasting or not actively broadcasting.

15. The computing system of claim 13, wherein determining the detection status comprises:
when the difference between the current time and the timestamp of the most recent observation report is greater than the detection interval, designating the first beacon device as not currently detected; and
when the difference between the current time and the timestamp of the most recent observation report is less than the detection interval, designating the first beacon device as currently detected.

16. The computing system of claim 13, wherein the operations further comprise:
receiving a device status request that requests an operational status of at least the first beacon device of the plurality of beacon devices; and
transmitting data that describes at least the determined detection status of the first beacon device.

17. The computing system of claim 13, wherein the operations of analyzing, comparing, and determining are performed in response to receipt of the device status request from the fleet owner computing device.

18. The computing system of claim 13, wherein analyzing the plurality of observation reports to determine the detection interval for the first beacon device comprises:

selecting a portion of the plurality of observation reports based at least in part on respective timestamps associated with the plurality of observation reports;
wherein selecting the portion comprises:
  selecting only a predetermined number of the most recent observation reports; or
  selecting only observation reports that have been received within a threshold amount of time.

19. The computing system of claim 13, wherein the operations further comprise:
  detecting a change in the detection status of the first beacon device from currently detected to not currently detected; and
  in response to detection of the change in the detection status, transmitting an alert to a fleet owner that indicates the detected change in detection status of the first beacon device from currently detected to not currently detected.

20. One or more non-transitory computer-readable media that collectively store instructions that, when executed by one or more processors, cause the one or more processors to perform operations, the operations comprising;
  receiving a plurality of observation reports respectively from a plurality of mobile computing devices, each observation report corresponding to an observation of a first beacon device by the reporting mobile device;
  analyzing the plurality of observation reports to determine a detection interval for the first beacon device, the detection interval comprising an amount of time that is based at least in part on a historical observation frequency at which the first beacon device has been observed by the mobile computing devices;
  comparing the detection interval of the first beacon device to a difference between a current time and a timestamp of a most recent observation report associated with the first beacon device; and
  determining a detection status of the first beacon device based at least in part on the comparison of the detection interval of the first beacon device to the difference between the current time and the timestamp of the most recent observation report associated with the first beacon device, wherein the detection status is indicative of a current operation status of the first beacon device.

* * * * *